Aug. 19, 1958     H. V. MAHON     2,847,856
LIQUID-LEVEL-INDICATING ROLLABLE CONTAINER
Filed Oct. 27, 1955
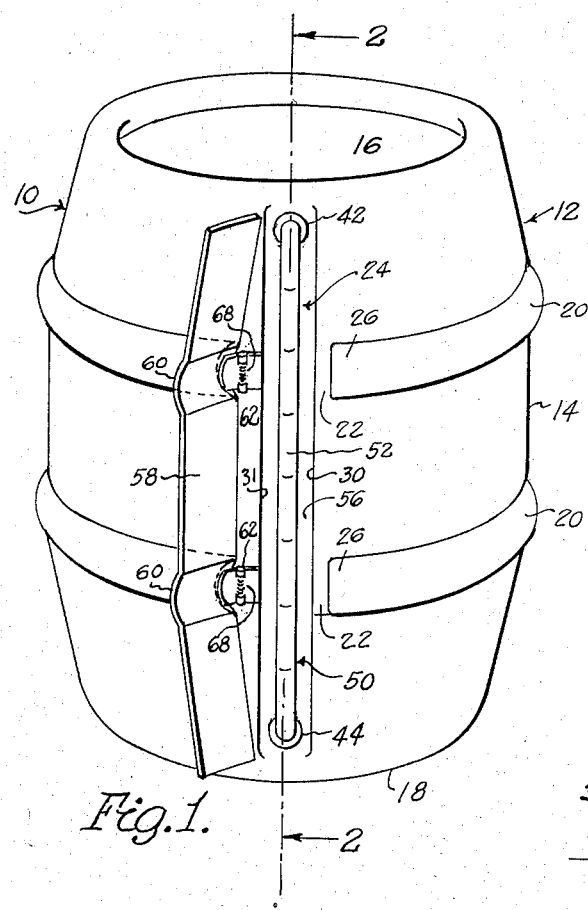
Fig.1.
Fig.3.
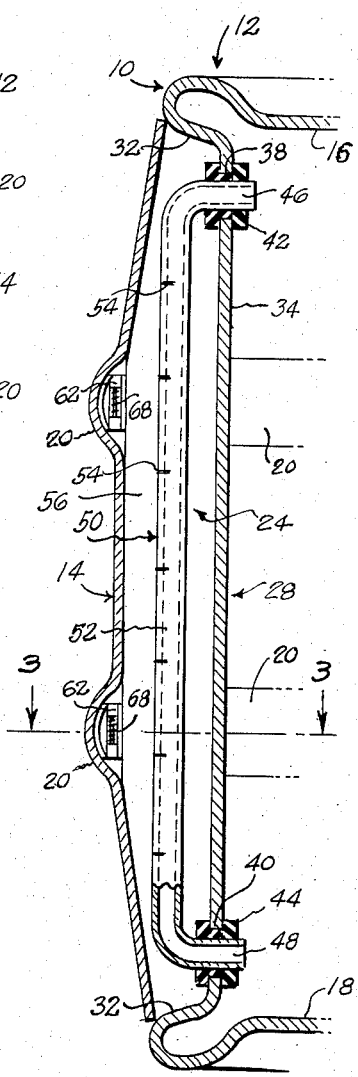
Fig.2.
INVENTOR.
Harvey V. Mahon
BY Barthel + Bugbee
Attys

United States Patent Office 2,847,856
Patented Aug. 19, 1958

2,847,856
LIQUID-LEVEL-INDICATING ROLLABLE CONTAINER

Harvey V. Mahon, Southampton, Ontario, Canada

Application October 27, 1955, Serial No. 543,196

2 Claims. (Cl. 73—325)

This invention relates to rollable liquid containers such as kegs, barrels and drums and, in particular, to rollable liquid-level-indicating containers.

One object of this invention is to provide a rollable liquid-level-indicating container having a longitudinal recess in the container side wall in which the liquid level indicator is located, and a protective cover extending over the recess and having a shape substantially forming a continuation of the shape of the container so as to enable the container to be rolled easily without interruption by or damage to the liquid-level indicator.

Another object is to provide a rollable liquid-level-indicating container of the foregoing character wherein the liquid level indicator is a gauge tube extending longitudinally of the recess and wherein the cover is movably connected to the container beside the recess and movable into and out of protecting relationship with the gauge tube.

Other objects and advantages of the invention will become apparent during the course of the following description of the accompanying drawings, wherein:

Figure 1 is a perspective view of a rollable liquid-level-indicating container, such as a barrel, equipped with a liquid level indicating gauge in a recess therein having a protective cover, according to one form of the invention, with the cover in its open position;

Figure 2 is a longitudinal vertical section taken along the line 2—2 in Figure 1, with the cover in its closed position; and Figure 3 is a horizontal fragmentary cross-section taken along the line 3—3 in Figure 2.

Hitherto, it has been difficult for users of liquids shipped or stored in rollable containers, such as barrels, to ascertain the amount of liquid left in them after a period of use or after unknown quantities of liquid have been withdrawn. This is a particularly difficult problem for the owners or managers of bars, taverns, hotels and other beverage dispensing establishments when such an individual desires to take an inventory of his stock. It is simple for him to do so with respect to the bottled beverages whose contents can be seen, but with respect to his draught beer, this is not possible because the kegs or barrels are opaque. Accordingly, the usual prior method of taking an inventory of draught beer in partially-filled kegs has been to tilt the kegs to and fro to shake their contents and estimate the location of the liquid level and consequently the quantity of beer therein by the sound of the liquid as it sloshes to and fro.

Moreover, it has hitherto not been possible to provide satisfactory liquid level gauges for rollable containers, such as kegs or barrels, because of the necessity of having to roll them on their sides between the brewer's truck and the storage room. Gauges which had to be inserted in the kegs were undependable and complicated in the use thereof, more particularly because the contents of a beer keg are under a considerable pressure.

The present invention solves these problems and eliminates these difficulties by providing a rollable container, such as a keg or barrel, having an elongated longitudinal recess in the side wall thereof and having a liquid level gauge disposed in the recess and protected by a cover adapted to be moved into a position over the recess and the gauge therein. The cover is preferably of a shape forming a continuation of the shape of the container side wall so that it will merge smoothly therewith and enable the container to be rolled smoothly along the floor or sidewalk without bumping or jolting. A spring or series of springs hold the cover normally in protecting position over the recess, the user swinging the cover aside in order to determine the liquid level in the container.

Referring to the drawing in detail, Figures 1 to 3 inclusive show a rollable liquid-level-indicating container, generally designated 10, consisting of a rollable container such as a metal beer keg, generally designated 12, having a side wall 14 of generally arcuate section both in cross-section and in longitudinal section and having end walls 16 and 18 at its upper and lower ends. The rollable container 12 is provided with the usual bungs (not shown) which are omitted to simplify the showing.

The side wall 14 is reinforced by generally annular circumferential ribs 20 having gaps 22 therein between which the liquid-level-indicating device, generally designated 24, is placed. For this purpose, the side wall 14 within the gaps 22 between the ends 26 of the ribs 20 is provided with an elongated longitudinally-extending integral indentation, generally designated 28, having side walls 30 and 31 (Figure 2), top and bottom walls 32 and 33 (Figure 3) and a rear wall 34. The rear wall 34 of the indentation 28 near the top and bottom walls 16 and 18 (Figure 2) is provided with upper and lower holes 38 and 40 respectively containing upper and lower tubular gaskets 42 and 44 in which are snugly inserted the upper and lower parallel ends 46 and 48 of a gauge tube 50 having an elongated vertical portion 52 extending between the short horizontal parallel portions 46 and 48 and preferably provided with graduations 54 for indicating the liquid level within the container 12. As will be seen from Figure 3, the vertical portion 52 of the gauge tube 50 is placed in the recess or cavity 56 formed by the indentation 28 well below the mouth or entrance thereto so as not to project therefrom and be damaged when the container 12 is rolled horizontally along the floor or sidewalk.

In order to further protect the gauge tube 50 and its associated parts, the container 12 is additionally provided with a vertically-elongated cover 58 of arcuate cross-section and longitudinal section conforming to and constituting in effect a continuation of the side wall 14, preferably also having rib sections 60 spanning the gaps 22 between the ends of the interrupted annular ribs 20. The cover 58 extends substantially from top to bottom of the indentation 28 and covers the mouth of the recess 56 formed thereby, and is movably mounted by means of hinges 62 secured to the inwardly-offset side wall 36 and cover 58 respectively, the rib sections 60 forming convenient points of attachment for the hinges 62 to the cover 58. The ends of the rib sections 60 are arranged to be substantially flush with the ends 26 of the ribs 20 so as to render rolling on the ribs 20 as smooth as possible. Ledges 66 are provided at the ends of the ribs 20 on one side of the gap 22 thereof to receive the edge 64 of the cover 58. The hinges 62 are equipped with torsion springs 63 (Figures 1 and 2) which constantly urge the cover 58 into its closed and protecting position shown in Figures 2 and 3.

In the use of the invention, let it be assumed that the container 12 has been filled with liquid, such as beer, at the brewery or other factory, and that it is to be delivered to a customer along a route which is at least a portion thereof requires rolling along a floor or sidewalk. Assuming that delivery is to be made, for example, in a truck, the springs 68 automatically swing the cover 58 into a closed position overlying the recess 56 formed by the indentation 28, and accordingly extending over the gauge tube 50 so as to completely protect it. The liquid-level-indicating container 10 may then be rolled along the floor, side walk or ground, as may be necessary or desirable, without injuring the gauge tube 50 and without permitting dirt or other foreign matter to enter the recess 56, because the cover 58 in its closed position substantially completely closes the recess or cavity 56.

When the container 10 arrives at its destination and has been rolled into the place of use, it is tilted into an upright position as shown in Figure 1, and the usual dispensing device inserted through the bung or other aperture, where the beer is dispensed by the pressure within the container 12 to the faucet at the bar. The springs 68 still urge the cover 58 into its closed position so that the gauge tube 50 cannot be damaged or broken by contact with or bumping against other objects in the storage room or room where it is used.

When the user wishes to take an inventory of his beverages, or ascertain the quantity of liquid in the container 12, whether or not it is a beverage, he graps the free edge 64 of the cover 58 and swings it outward like a door into the open position shown in Figure 1, holding it in one hand while he examines the gauge tube 50 in order to ascertain the liquid level therein by means of the graduations 54 on the vertical portion 52 thereof. Having made his inspection or inventory, he releases the edge 64 of the cover 58, whereupon the springs 68 swing the door 58 back into its closed gauge-tube-protecting position shown in Figures 2 and 3. When the container 12 has been emptied and is shipped back to the factory or brewery, as the case may be, it may also be rolled along the floor, ground or sidewalk at any location where it is desirable to do so, the cover 58 again protecting the gauge tube 50 of the liquid-level-indicating device 24.

While the invention has been particularly described in connection with its use in rollable containers such as kegs or barrels used for beverages, it will also be evident that it is equally useful as a liquid-level-indicating rollable container for liquids other than beverages, for example, oils, lacquers, liquid chemicals, solvents, liquid fuels and other liquids shipped or stored in rollable containers.

What I claim is:

1. A rollable liquid-level-indicating container comprising a hollow liquid receptacle having end walls and a side wall, said side wall being of substantially the shape of a geometrical surface of revolution and having an elongated longitudinally-extending recess therein interrupting the continuity thereof, an elongated liquid-level-indicating gauge tube disposed longitudinally in said recess, said side wall having longitudinally-spaced interrupted circumferential rolling ribs extending therearound and having gaps therein at said recess with the rib ends disposed near the edges of said recess, hinges mounted in said gaps and secured to said side wall at said rib ends; a recess cover secured to said hinges and engageable with said side wall and rib ends, said cover being movable on said hinges into and out of protective covering relationship with said recess and gauge tube, and means releasably holding said cover in engagement with said side wall in covering relationship with said recess, said cover also having the shape of a geometrical surface of revolution similar to that of said side wall and substantially merging with said side wall at opposite edges of said recess.

2. A rollable liquid-level-indicating container comprising a hollow liquid receptacle having end walls and a side wall, said side wall being of substantially the shape of a geometrical surface of revolution and having an elongated longitudinally-extending recess therein interrupting the continuity thereof, an elongated liquid-level-indicating gauge tube disposed longitudinally in said recess, said side wall having longitudinally-spaced interrupted circumferential rolling ribs extending therearound and having gaps therein at said recess with the rib ends disposed near the edges of said recess, hinges mounted in said gaps and secured to said side wall at said rib ends; a recess cover secured to said hinges and engageable with said side wall and rib ends, said cover being movable on said hinges into and out of protective covering relationship with said recess and gauge tube, and means releasably holding said cover in engagement with said side wall in covering relationship with said recess, each of said ribs of said side wall at the end thereof across its gap from its hinge having a counter-recess adjacent the adjoining edge of said recess of a depth at least equal to the edge thickness of said cover, and the edges of said cover fitting into said counter recess, said cover also having the shape of a geometrical surface of revolution similar to that of said side wall at opposite edges of said counter-recess.

References Cited in the file of this patent

UNITED STATES PATENTS

| | | |
|---|---|---|
| 529,202 | Schramm | Nov. 13, 1894 |
| 936,509 | Anderson | Oct. 12, 1909 |
| 1,075,025 | Drautzburg | Oct. 7, 1913 |
| 2,052,344 | Edelmann | Aug. 25, 1936 |
| 2,593,172 | Neuman | Apr. 15, 1952 |